(12) United States Patent
Kamijima (10) Patent No.: US 8,756,592 B2
(45) Date of Patent: Jun. 17, 2014

(54) INFORMATION PROCESSOR AND INFORMATION UPDATING METHOD

(75) Inventor: Kyoichi Kamijima, Suwa (JP)

(73) Assignee: Seiko Epson Corporation, Tokyo (JP)

( * ) Notice: Subject to any disclaimer, the term of this patent is extended or adjusted under 35 U.S.C. 154(b) by 1154 days.

(21) Appl. No.: 11/931,873

(22) Filed: Oct. 31, 2007

(65) Prior Publication Data
US 2008/0104585 A1 May 1, 2008

(30) Foreign Application Priority Data

Nov. 1, 2006 (JP) .................................. 2006-297884

(51) Int. Cl.
*G06F 9/44* (2006.01)
*G06F 9/445* (2006.01)

(52) U.S. Cl.
USPC ............ 717/168; 717/170; 717/173; 717/177

(58) Field of Classification Search
None
See application file for complete search history.

(56) References Cited

U.S. PATENT DOCUMENTS

| | | | | |
|---|---|---|---|---|
| 6,467,087 B1 * | 10/2002 | Yang | ............................. | 717/168 |
| 7,043,664 B1 * | 5/2006 | Chiloyan | ...................... | 714/5.11 |
| 7,698,698 B2 * | 4/2010 | Skan | ............................. | 717/168 |
| 7,770,165 B2 * | 8/2010 | Olson et al. | .................... | 717/168 |
| 2004/0194081 A1 * | 9/2004 | Qumei et al. | ................. | 717/173 |
| 2006/0048144 A1 * | 3/2006 | Willess et al. | ................ | 717/177 |
| 2006/0070055 A1 * | 3/2006 | Hodder et al. | ................ | 717/168 |
| 2006/0075284 A1 * | 4/2006 | Skan | .................... | 714/5 |
| 2006/0117313 A1 * | 6/2006 | Yeh et al. | ....................... | 717/168 |
| 2006/0272010 A1 * | 11/2006 | Kim | .................................. | 726/3 |
| 2007/0055854 A1 * | 3/2007 | Chang et al. | ........................ | 713/1 |
| 2008/0052698 A1 * | 2/2008 | Olson et al. | .................... | 717/168 |
| 2008/0126788 A1 * | 5/2008 | Kreek et al. | ................... | 713/100 |
| 2008/0127159 A1 * | 5/2008 | Regenmorter | ................ | 717/168 |
| 2008/0168435 A1 * | 7/2008 | Tupman et al. | ................ | 717/173 |

FOREIGN PATENT DOCUMENTS

| | | |
|---|---|---|
| JP | 06266552 A | 9/1994 |
| JP | 2000187588 A | 7/2000 |
| JP | 2003263323 A | 9/2003 |
| JP | 2004-192329 A | 7/2004 |
| JP | 2004318871 A | 11/2004 |
| JP | 2006252278 A | 9/2006 |

OTHER PUBLICATIONS

Jiejun Kong et al., ESCORT a Decentralized and Localized Access Control System for Mobile Wireless Access to Secured Domains, 2003 ACM, pp. 51-60, <http://dl.acm.org/citation.cfm?id=941311.941320>.*

(Continued)

*Primary Examiner* — Thuy Dao
*Assistant Examiner* — Cuong V Luu
(74) *Attorney, Agent, or Firm* — Sughrue Mion, PLLC (57) ABSTRACT

Prior to updating of an information processing program that stores a program update module for updating a wireless interface driver or the information processing program used for communications with a router, a printer stores the minimal information necessary for communications such as the wireless interface driver or setting information (service set identification (SSID), Wep key, etc.) necessary for using the wireless interface driver in basic update user information stored in an area different from an area for the information processing program. If updating of the information processing program is suspended and an error occurs in the information processing program, a basic update module protected from overwriting utilizes the basic update user information to restart communications with the router.

6 Claims, 4 Drawing Sheets

(56) References Cited

OTHER PUBLICATIONS

William Gatliff, Implementing Downloadable Firmware With Flash Memory, 2001 Embedded Systems Programming Magazine, 16 pages, <http://toxyn.org/~pmsac/oldies.misc/flash.pdf>.*

Bernd Eichberger et al., Security Device for Licensing Embedded Systems Hardware on a Dedicated Firmware, 2006 Embedded world, 5 pages, <https://www.campus02.at/data/Security_Device_Paper_EW-2006.pdf>.*

James Hsieh et al., Sun Fire Midframe Server Best Practices Update for Firmware 5.13.x, 2002 Sun, 32 pages, <http://citeseerx.ist.psu.edu/viewdoc/download?doi=10.1.1.150.9568&rep=rep1&type=pdf>.*

William Gatliff, Implementing a Flash Memory Loader, 1996 Embedded systems programming, pp. 98-100, <ftp://ftp.hte.com/uconline/rteos/library/9611_098.pdf>.*

Christopher R. Lumb et al., Freeblock Scheduling Outside of Disk Firmware, 2002 USENIX, pp. 275-288, <http://static.usenix.org/publications/library/proceedings/fast02/full_papers/lumb/lumb_html/>.*

* cited by examiner

INFORMATION PROCESSOR AND INFORMATION UPDATING METHOD

BACKGROUND OF THE INVENTION

1. Field of the Invention

The present invention relates to an information processor and an information updating method.

2. Description of the Related Art

Up to now, an information processor equipped with a non-volatile flash memory that stores a normal system BIOS as firmware and a recovery BIOS intended to recover a normal system and protected from change of stored data has been proposed (see Japanese Unexamined Patent Application Publication No. 6-266552, for instance). If any trouble occurs upon updating the normal system BIOS and the normal system malfunctions, the information processor disclosed in Japanese Unexamined Patent Application Publication No. 6-266552 is activated on the recovery BIOS having a limited function of recovering the normal system, reads the normal system BIOS from a data storage device connected to a flash memory or a processor, and updates the malfunctioning normal system BIOS to thereby recover the normal system BIOS. Since the recovery BIOS has a limited function of recovering the normal system BIOS, a memory area of a flash memory used for recovery can be reduced. In addition, stored data of the recovery BIOS is protected from overwriting, so the normal system BIOS can be relatively reliably recovered.

As disclosed in Japanese Unexamined Patent Application Publication No. 6-266552, general information processors update, for example, a communication driver used for receiving information from any other firmware used in the information processors, for example, a connected device through communications in some cases. In such cases, the information processor as disclosed in Japanese Unexamined Patent Application Publication No. 6-266552 does not consider the case where the processor cannot communicate with a data storage device. Thus, if an error is detected in new firmware, in particular, information about communication processing, then the processor cannot communicate with a connected device such as a data storage device in some cases. If such an error is detected, it is preferred to easily recover the system. Further, as a possible solution to the trouble upon updating, all firmware to be updated may be saved in another memory area of the flash memory or the like. In this case, however, there arises a problem of increasing a memory area necessary for updating the firmware.

SUMMARY OF THE INVENTION

The present invention has been accomplished in view of the above problems, and it is accordingly an object of the present invention to provide an information processor capable of communicating with an external device with reliability even if an error is detected in communication processing data used for communication processing at the time of updating an information processing program through communications with the external device, and provide an information updating method and a program used for the information processor and the information updating method. Another object of the present invention is to provide an information processor that facilitates recovery from an error detected in communication processing data used for communication processing at the time of updating an information processing program through communications with the external device, in a simpler manner, and provide an information updating method and a program used for the information processor and the information updating method. Still another object of the present invention is to provide an information processor capable of reducing a memory area used for updating an information processing program through communications with an external device, and provide an information updating method and a program used for the information processor and the information updating method.

To attain at least one of the above objects, the present invention employs the following.

The present invention provides an information processor that stores update information about a new update and updates information through communications with an external device capable of outputting the update information. The information processor includes a transmitting/receiving module that transmits/receives information and a storage module that stores an information processing program which stores communication processing data used for communication processing of the transmitting/receiving module and executes the communication processing of the transmitting/receiving module, a program update sub-module which updates the information processing program, a basic update sub-module which is protected from overwriting and updates information stored in the information processor, and basic update use information which is stored in an area different from an area for the information processing program and stores information used by the basic update sub-module. The information processor further includes a control module that, in response to reception of a program update instruction as an instruction to update the information processing program by the transmitting/receiving module, stores the communication processing data in the basic update use information, causes the transmitting/receiving module to receive a new information processing program from the external device by use of the program update sub-module, determines whether or not the received new information processing program is normal, and, when a determination result shows that the new information processing program is not normal, makes the transmitting/receiving module communicable with the external device in accordance with the communication processing data stored in the basic update use information by use of the basic update sub-module.

According to this information processor, in response to a program update instruction as an instruction to update an information processing program, communication processing data used for communication processing is stored in basic update use information, a program update sub-module is used to receive a new information processing program from an external device, and it is determined whether or not the received new information processing program is normal. When it is determined that the new information processing program is not normal, a basic update sub-module is used to enable communications with the external device on the basis of communication processing data stored in basic update use information. As described above, any error occurs in the communication processing data stored in the information processing program to be updated at the time of updating the information processing program in some cases, but the communication processing data is saved in the basic update use information stored in an area different from an area for the information processing program, so the saved communication processing data can be used later with the program update module or basic update module. Further, the basic update sub-module is protected from overwriting, so no error occurs during update processing of the information processing program. Hence, even if an error occurs in the communication processing data used for communication processing at the time of updating the information processing program through communications with the external device, the processor can reliably communicate with the external device. Further, a new information processing program can be retrieved from the external device through communications, so recovery from the error is more facilitated. Further, since the communication processing data is saved in the basic update use information, a memory area used for updating the information processing program can be saved as compared with the case of saving the information processing program to be updated in another area of the storage means in the event of an error upon updating. Here, the "communication processing data" includes a communication driver used for controlling the transmitting/receiving module, setting information used by the communication driver, or a setting module for passing the setting information to the communication driver.

In the information processor of the invention, the storage module may store communication management information which stores setting information used for a communication driver as the communication processing data, and the information processing program which stores the program update sub-module and a communication sub-module, the communication sub-module including a setting sub-module as the communication processing data for passing the setting information to the communication driver and being capable of executing communication processing of the transmitting/receiving module. The control module, in response to reception of a program update instruction as an instruction to update the information processing program by the transmitting/receiving module, may store the setting sub-module and the communication driver as the communication processing data stored in the information processing program and the setting information stored in the communication management information in the basic update use information, and make the transmitting/receiving module communicable with the external device in accordance with the communication driver, the setting module, and the setting information stored in the basic update use information by use of the basic update sub-module if a determination result shows that the new information processing program is not normal. Here, in the case where a communication driver of the external device is updated, if the communication driver in the information processor as the communication processing data is accordingly updated, setting information used for the communication driver might be changed. In this case, the basic update sub-module protected from overwriting could not use the communication driver stored in the basic update use information. In some cases, any error occurs in the communication driver or program update sub-module stored in the information processing program to be updated at the time of updating the information processing program, but the setting information used for the updated communication driver and the setting sub-module used as communication processing data for passing the setting information to the communication driver are stored in the basic update use information, so the saved communication processing data can be used later with the basic update sub-module.

In the information processor of the invention, the storage module may store a communication driver used for communication processing of the transmitting/receiving module, communication management information which stores setting information used by the communication driver, and the information processing program which stores the program update sub-module and a communication sub-module, the communication sub-module including a setting sub-module as the communication processing data for passing the setting information to the communication driver and being capable of executing communication processing of the transmitting/receiving module. The control module, in response to reception of a program update instruction as an instruction to update the information processing program by the transmitting/receiving module, may store the setting information and the setting sub-module stored in the storage module in the basic update use information, and makes the transmitting/receiving module communicable with the external device in accordance with the setting information and the setting sub-module stored in the basic update use information and the communication driver stored in the storage module by use of the basic update sub-module when a determination result shows that the new information processing program is not normal. Here, in some cases, any error occurs in the setting module for passing the setting information stored in the information processing program to be updated to the communication driver, communication management information that stores the setting information, the program update module at the time of updating the information processing program. Further, in the case where a communication driver of the external device is updated, if the communication driver in the information processor is accordingly updated, setting information used for the communication driver might be changed. In this case, even if the communication driver stored separately from the information processing program is normal, the communication driver could not be used with the basic update module protected from overwriting. In this example, setting information used by the updated communication driver and the setting module for passing the setting information to the communication driver are stored in the basic update use information, so the updated communication driver can be used later with the basic update module.

In the information processor equipped with the setting sub-module, the control module may make the transmitting/receiving module communicable with the external device in accordance with information stored in the basic update use information by causing the basic update sub-module to make the setting sub-module pass the setting information to the communication driver so as to drive the communication driver.

In the information processor of the invention, the control module may make the transmitting/receiving module communicable with the external device in accordance with information stored in the basic update use information by use of the basic update sub-module, and, in response to reception of a new information processing program from the external device during communications with the external device are established, may update a current information processing program to the received new information processing program.

In the information processor of the invention, the transmitting/receiving module may transmit/receive information to/from the external device by wireless communication. In this case, the "setting information" includes SID (Service Set ID) and Wep (Wired Equivalent Privacy) key.

The information processor may further include a print execution module that executes printing an image on a printing medium, and the storage module may store the information processing program that stores a printing sub-module used by the print execution module.

The present invention also provides an information updating method that stores update information about a new update and updates information by use of an information processor through communications with an external device capable of outputting the update information. The information processor has a storage module that stores an information processing program which stores communication processing data used for the communications and executes communication processing, a program update sub-module which updates the information processing program, a basic update sub-module which is protected from overwriting and updates information stored in the information processor, and basic update use information which is stored in an area different from an area for the information processing program and stores information used by the basic update sub-module. The information updating method includes the steps of: (a) in response to reception of a program update instruction as an instruction to update the information processing program, storing the communication processing data in the basic update use information; (b) receiving a new information processing program from the external device by use of the program update sub-module and determining whether or not the received new information processing program is normal; and (c) when a determination result shows that the new information processing program is not normal, establishing communication with the external device in accordance with the communication processing data stored in the basic update use information by use of the basic update sub-module. The information updating method of the invention may employ any arrangement described above in connection with the information processor of the invention, and may include additional steps that realize respective functions of the information processor of the invention.

The present invention is also actualized as a program that causes one or multiple computers to execute the respective steps of the information updating method of the invention described above. The program may be recorded in a computer readable recording medium (for example, a hard disk, a ROM, an FD, a CD, or a DVD), may be transferred from one computer to another computer via a transfer medium (a communication network like the Internet or a LAN), or may be transmitted in any other suitable form. By causing a single computer execute all the procedures or multiple computers share execution of the procedures, the respective steps of the information updating method are executed so as to achieve the same effects as those by the information updating method.

DESCRIPTION OF THE PREFERRED EMBODIMENTS

Figure 1:
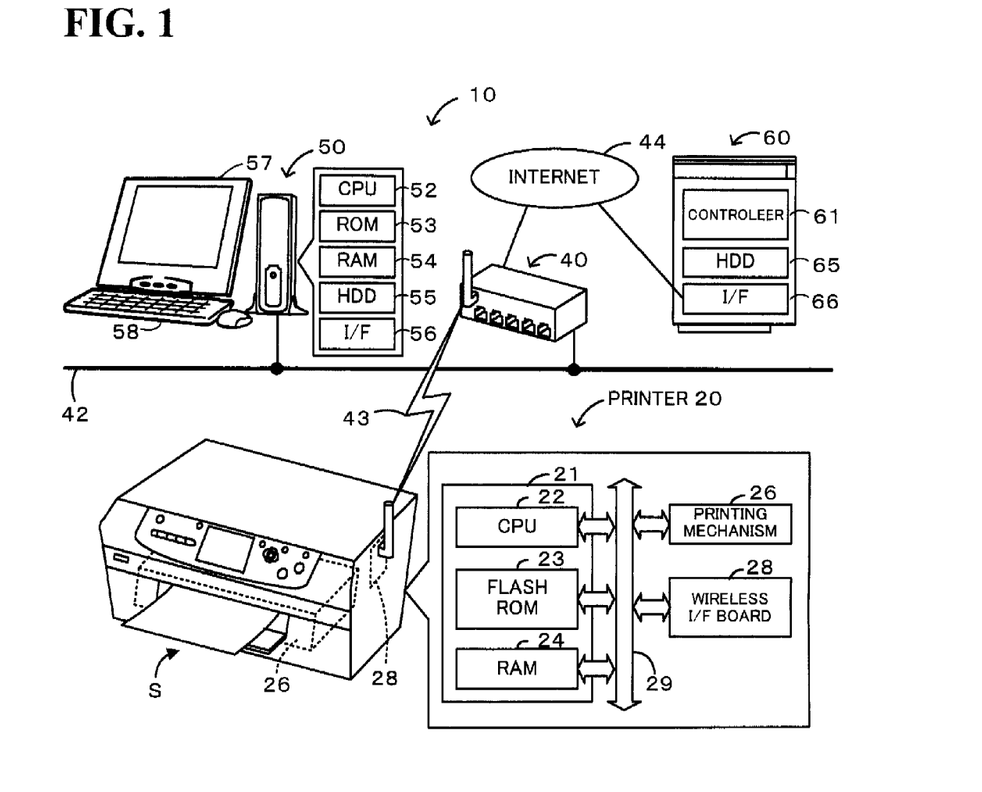
FIG. 1 is a schematic diagram of the configuration of a firmware updating system 10.
Figure 2:
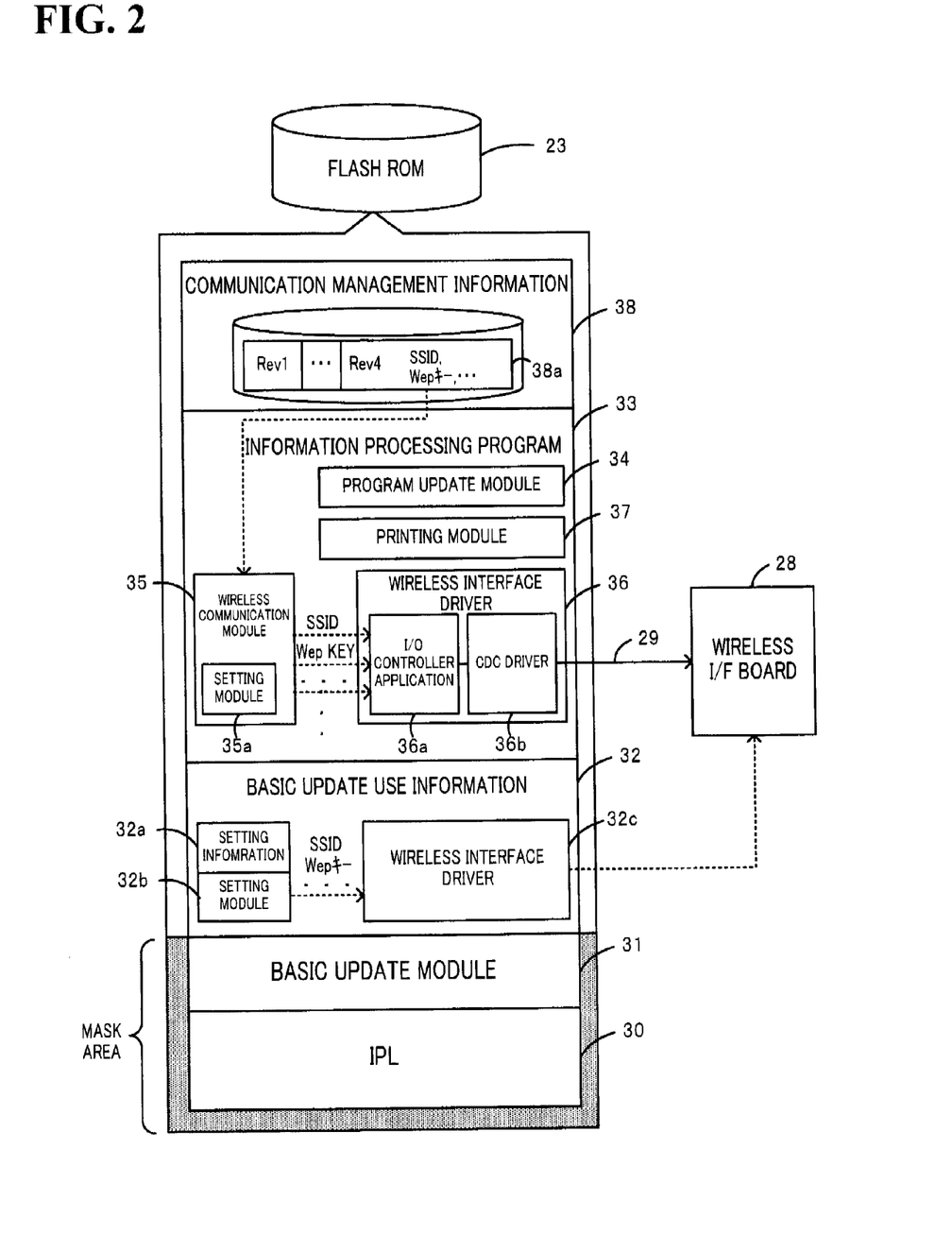
FIG. 2 illustrates information stored in a flash ROM 23 of a printer 20.

Hereinafter, an embodiment of the present invention will be described. FIG. 1 is a schematic diagram of the configuration of a firmware updating system 10 according to the embodiment of the present invention. FIG. 2 illustrates information stored in a flash ROM 23 of a printer 20. The firmware updating system 10 of this embodiment includes the printer 20 for printing an image on recording paper S, a router 40 connected to the printer 20 through a wireless LAN 43, a user personal computer (PC) 50 connected to the router 40 through a LAN 42, and an information server 60 connected to the router 40 through an Internet 44.

The printer 20 includes a controller 21 for controlling the entire apparatus, a printing mechanism 26 for printing an image on the recording paper S, and a wireless interface (I/F) board 28 connected to the wireless LAN 43. The controller 21 is configured as a microprocessor centered around a CPU 22, and includes a flash ROM 23 as a writable/erasable non-volatile storage medium, which stores various kinds of processing programs, and a RAM 24 for temporarily storing data. Information stored in the flash ROM 23 is described below. The printing mechanism 26 is an ink-jet mechanism that pressurizes ink of different colors and discharges the pressured ink to the recording paper S to print an image although not shown. The controller 21 is connected with the printing mechanism 26 and the wireless I/F board 28 through a bus 29.

As shown in FIG. 2, the flash ROM 23 stores a basic update module 31 that is stored in an IPL (Initial Program Loader) 30 as a code for loading a program that would be first executed on start-up of the printer 20 or a mask area protected from overwriting and is capable of updating all information (inclusive of a kernel language portion of an OS, for example) stored in the flash ROM 23, basic update use information 32 for storing information necessary for the basic update module 31, an information processing program 33 as firmware for storing a wireless interface driver 36 or the like and executing communication or printing processing of the printer 20, and communication management information 38 as a database that stores setting information 38a regarding settings for communications. The basic update module 31 is incorporated into the IPL 30, and writes new information to a designated memory block to thereby update information stored in the flash ROM 23. In case of an emergency, for example, in the case where a trouble such as blackout occurs and causes an error in updated information, the module 31 reupdates the information involving an error. Stored as the basic update use information 32 are the minimal information necessary for controlling the wireless I/F board 28 out of the information in the information processing program 33, for example, a setting information file 32a as a text file created on the basis of the setting information 38a as information necessary for the currently-used wireless interface driver 36, a setting module 32b for setting parameters (for example, SSID, Wep key, etc.) included in the setting information file 32a to the wireless interface driver 36, and a wireless interface driver 32c for driving the wireless I/F board 28. These information are stored as a backup of the information processing program 33. The information processing program 33 includes a program update module 34 for updating information stored in the information processing program 33, a wireless communication module 35 for analyzing information stored as the communication management information 38 and performing wireless communications, and the wireless interface driver 36 for driving the wireless I/F board 28 and in addition, a printing module 37 used for printing processing of the printing mechanism 26. The program update module 34 is updatable, and can update information in the information processing program 33 along with update of the wireless interface driver. The wireless communication module 35 includes an interpretation module (not shown) capable of interpreting information stored as the communication management information 38 as a database, and a setting module 35a for setting parameters necessary for communication processing interpreted with the interpretation module to the wireless interface driver 36. The wireless interface driver 36 includes an I/O controller application 36a to which parameters are set by the setting module 35a, and a CDC (Communication Device Class) driver 36b for controlling the wireless I/F board 28 on the basis of the information set by the I/O controller application 36a. If an error occurs in the information processing program 33 upon updating, for example, the stored program update module 34, wireless communication module 35, and wireless interface driver 36 cannot normally operate. The communication management information 38 is a database that stores the setting information 38a including, for example, information necessary for communication processing of the wireless interface driver 36 (for example, SSID, Wep key, etc.), access information for wireless communications, and timeout information of LPR (Line PRinter daemon protocol). As for the setting information 38a, if an initial value Rev1 is updated to Rev2, 3, 4, . . . according as the router 40 is replaced to thereby update the wireless interface driver. Thus, the basic update module 31 protected from overwriting can interpret the initial value Rev1. However, if information stored as the communication management information 38 is updated as the wireless interface driver 36 is updated as described above, a new setting value is added, making it impossible to interpret the setting information 38a. Then, the wireless interface driver 36 cannot be used as it is.

As shown in FIG. 1, the router 40 routes data sent from the printer 20, the user PC 50, the information server 60, or other such client devices to a designated destination in accordance with a routing table that describes a communication path.

The user PC 50 is a known general-purpose personal computer on a user side. The PC 50 includes a CPU 52, a ROM 53 for storing various kinds of control programs, a RAM 54 for temporarily storing data, an HDD 55 as a bulk memory for storing various kinds of application programs or data files, and an I/F 56 capable of transmitting/receiving signals to/from a device connected to the LAN 42. The user PC 50 causes the printer 20 to update stored information, transmits printing data to the printer 20 to print the printing data, or accesses the information server 60 to retrieve information about update of the printer 20 with installed programs. The user PC 50 includes a display 57 for displaying various kinds of information on a screen and an input unit 58 such as a keyboard with which a user enters various instructions. The user PC 50 has a function of executing a function corresponding to user's operations, for example, an operation of moving a cursor displayed on the display 57 to enter data.

The information server 60 is a server that provides the user PC 50 or the printer 20 with information about program updates. The server 60 includes a controller 61 centered around a CPU for executing various types of control, an HDD 65 as a bulk memory that stores various kinds of application programs or data files such as information about program updates, and an I/F 66 capable of transmitting/receiving signals to/from a device connected to the Internet 44. The information server 60 transmits/receives data to/from the printer 20 or the user PC 50 through the Internet 44 by use of a receiving buffer and a transmitting buffer assigned to a predetermined area of a RAM (not shown) of the controller 61.

Figure 3:
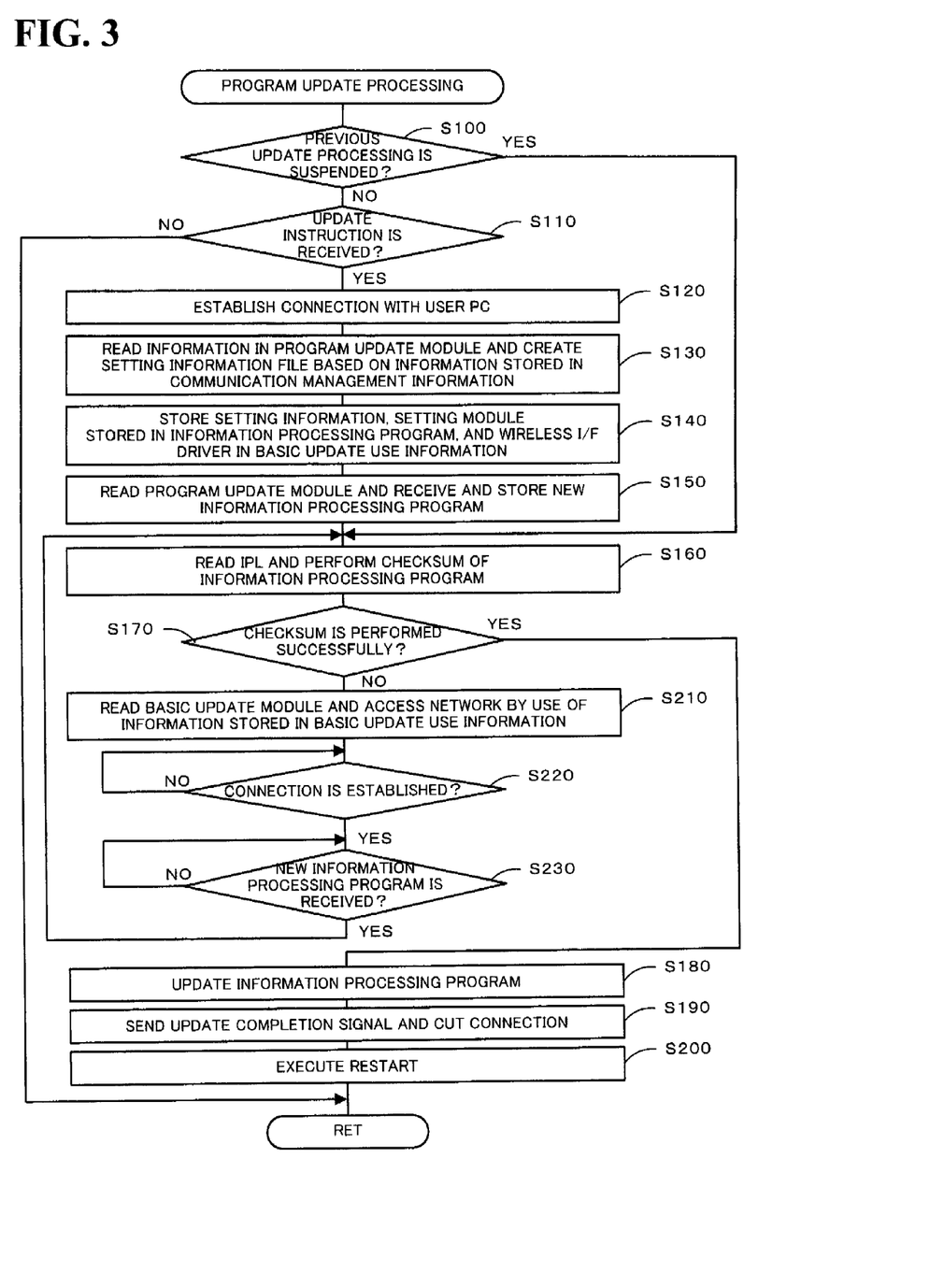
FIG. 3 is a flowchart showing an example of a program update processing routine.

Next, operations of the thus-configured firmware updating system 10 of this embodiment, in particular, operations of updating the information processing program 33 stored in the flash ROM 23 of the printer 20 are described. First, a user operates the input unit 58 to start a browser and designates a preset URL for updating the information processing program 33 stored in the printer 20. Then, the CPU 52 of the user PC 50 downloads a new information processing program stored in the information server 60 through the I/F 56 or the router 40 and stores the downloaded file in a predetermined area of the HDD 55 as well as sends an instruction to update the information processing program 33 to the printer 20 through the I/F 56 or the router 40. On the other hand, when a user powers on the printer 20, the CPU 22 of the printer 20 executes a program update processing routine of FIG. 3. FIG. 3 is a flowchart showing an example of the program update processing routine executed by the CPU 22 of the printer 20. This routine is stored in the flash ROM 23 and repeatedly executed at regular intervals (for example, intervals of several milliseconds) from the start-up of the printer.

As the routine is started, the CPU 22 first determines whether or not previous update processing of the information processing program 33 is suspended (step S100). Here, updating is suspended for the reason that a trouble occurs in a power supply system such as blackout or plug off during updating of the information processing program 33, for example. Whether or not previous update processing of the information processing program 33 is suspended can be determined with reference to an update confirmation flag F that is set to 1 during updating of information and set to 0 at the completion of updating, and is stored in the flash ROM 23. If previous update processing of the information processing program 33 is not suspended, that is, updating is completed and the information processing program 33 can normally operate, the CPU 22 determines whether or not the wireless I/F board 28 receives an update instruction from the user PC 50 (step S110). If no update instruction is received from the user PC 50, the routine is ended at once. If an update instruction is received from the user PC 50, the CPU 22 establishes connection with the user PC 50 (step S120). At this time, the CPU 22 reads information from the wireless communication module 35 to analyze the setting information 38a and sequentially pass and set parameters (for example, SSID, Wep key, etc.) necessary for communication processing as the analysis result to the I/O controller application 36a by use of the setting module 35a. Then, the CPU 22 drives the wireless I/F board 28 by use of the CDC driver 36b on the basis of the information set to the I/O controller application 36a to thereby establish connection with the user PC 50. When the connection is established, the CPU 22 sends a response signal (for example, an ACK handshake signal) to the user PC 50.

Next, the CPU 22 reads information in the program update module 34 stored in the information processing program 33 and extracts a predetermined parameter from the setting information 38a stored in the communication management information 38 to create the setting information file 32a as a text file including the extracted parameter (step S130). The setting information file 32a may be created by analyzing parameters to be set to the I/O controller application 36a with the wireless communication module 35 and arranging the parameters as the analysis result in the order in which the parameters are set to the I/O controller application 36a in CSV format. Alternatively, the setting information file 32a may be created in accordance with the analysis result of the wireless communication module 35 in step S120.

Next, the CPU 22 reads information in the setting module 35a stored in the wireless communication module 35 of the information processing program 33 and the wireless interface driver 36 stored in the information processing program 33, and stores the read information as the setting module 32b and the wireless interface driver 32c in the basic update use information 32 together with the setting information file 32a (step S140). In this way, the minimal information necessary for wireless communications with an external device such as the user PC 50 is stored in the basic update use information 32 in case an error occurs in the information processing program 33. Next, the CPU 22 reads the program update module 34 and receives a new information processing program from the user PC 50 by use of the program update module 34 and also stores the program in the flash ROM 23 (step S150). Here, if a response to the update instruction is sent back to the user PC 50, the CPU 52 of the user PC 50 sends a new information processing program stored in the HDD 55 to the printer 20 in response to the response signal, and the printer 20 receives the sent information. Receiving the new information processing program, the CPU 22 overwrites the stored information processing program 33 with the received program and stores the overwritten program.

After the completion of the processing in step S150, the IPL 30 is read to checksum the information processing program 33 (step S160). Then, it is determined whether or not the information processing program 33 is successfully checksummed (step S170). If the information processing program 33 is successfully checksummed, that is, an amount of information to be received matches with an amount of actually received information, update processing for constructing the available information processing program 33 is executed (step S180). After the completion of updating the information processing program 33, an update completion signal and a disconnection signal for disconnection from the user PC 50 are sent to the user PC 50 (step S190), and restart is executed (step S200). Then, the routine is ended. In this way, the printer 20 can use the information processing program 33 that stores the updated program update module 34, the updated wireless communication module 35, the updated wireless interface driver 36, and the updated printing module 37.

On the other hand, if it is determined that previous update processing of the information processing program 33 is suspended in step S100, the CPU 22 executes checksum processing on the information processing program 33 in step S160. Incidentally, if a power supply system of the printer 20 is recovered after the updating of the information processing program 33 was suspended due to a trouble in the power supply system, this routine is repeated from step S100. Here, if updating of the information processing program 33 is suspended during an overwrite save operation thereof, it is determined that checksum ends in failure in step S170. If it is determined that checksum ends in failure in step S170, the CPU 22 supposes that the information processing program 33 cannot be used, and reads the basic update module 31 and accesses the network with reference to the previously stored setting information file 32a, setting module 32b, and wireless interface driver 32c on the basis of the read module 31 (step S210). In this example, the basic update module 31 is read, and parameters (for example, SSID, Wep key, etc.) included in the setting information file 32a are sequentially passed and set to the wireless interface driver 32c with the setting module 32b in accordance with the processing of step S120. Then, the wireless I/F board 28 is controlled with the wireless interface driver 32c to thereby recover the current condition to allow communications with the router 40 via the wireless LAN 43. As described above, if the update processing of the information processing program 33 is suspended and an error occurs in the information processing program 33, it is impossible to establish communications with the user PC 50 or the information server 60 with the wireless interface driver 36 as well as to perform update processing of the information processing program 33 with the program update module 34 stored in the information processing program 33. However, at least wireless communications with the router 40 are reestablished on the basis of the minimal information that is stored in the basic update use information 32 before updating of the information processing program 33 and enables restart of communication processing.

Subsequently, the CPU 22 determines whether or not connection with the user PC 50 is established (step S220) and waits until the connection with the user PC 50 is established. Then, the CPU 22 determines whether or not a new information processing program is received from the user PC 50 (step S230). Then, the CPU 22 waits until the new information processing program is received from the user PC 50, and if determining that the new information processing program is received from the user PC 50, stores the new information processing program in the flash ROM 23, and repeats the above processing from step S160. In this example, at the time of updating the information processing program 33, the program update module 34 stored in the information processing program 33 could not normally operate, so a new information processing program is sent from the user PC 50 side. As described above, if an error is detected in the information processing program 33, only connection via the wireless LAN 43 is recovered by use of the basic update module 31 protected from overwriting and the basic update use information 32 to automatically recover the information processing program 33.

Figure 4:
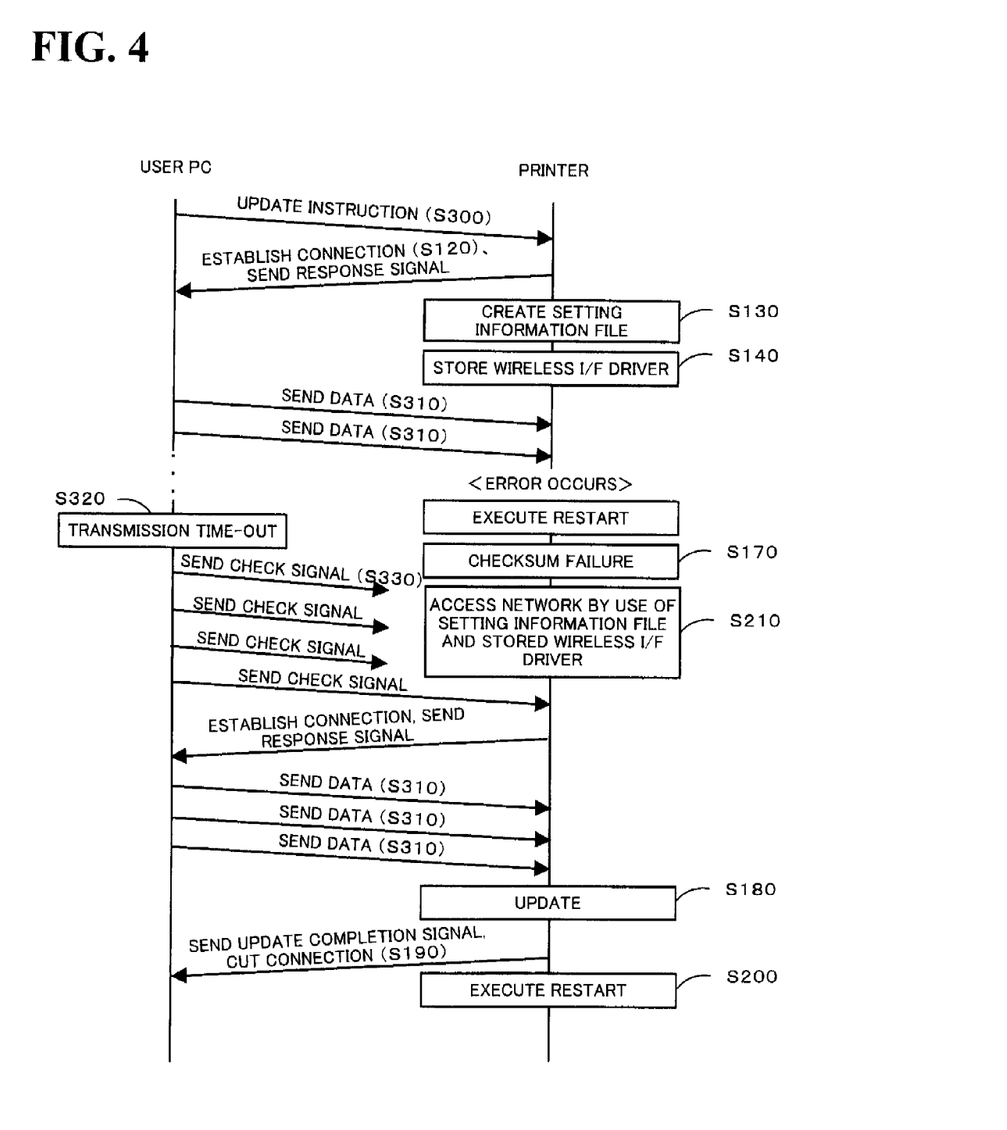
FIG. 4 illustrates information updating processes and communication processes in sequential order.

Referring now to FIG. 4, processing of the user PC 50 is described. FIG. 4 illustrates processing and communications performed between the printer 20 of the firmware update system 10 and the user PC 50 in sequential order. Incidentally, step numbers in FIG. 4 correspond to those in the routine of FIG. 3. FIG. 4 shows the case where a trouble occurs in a power supply system of the printer 20 during transmission of a new information processing program from the user PC 50 to the printer 20. First, the CPU 52 of the user PC 50 sends an instruction to update the information processing program 33 to the printer 20 (step S300). After the connection is established, the CPU 52 sends a new information processing program to the printer 20 (step S310). If the printer 20 is turned off during the data transmission, the CPU 52 cannot send the data to the printer 20, resulting in transmission time-out (step S320). At this time, the CPU 52 supposes that a trouble occurs in the printer 20, and sends a check signal (step S330). When the printer 20 accesses the network on the basis of the basic update use information 32 and sends back a response to the check signal, the CPU 52 sends a new information processing program to the printer 20 (step S310). After that, if receiving a completion signal and a disconnection signal, the CPU 52 completes the update processing. Incidentally, also in the case where a completion signal cannot be received within a predetermined period, resulting in completion time-out, the CPU 52 may determine that a trouble occurs in the printer 20.

Here, correspondences between components of this embodiment and constituent elements of the present invention are specified. The wireless I/F board 28 of this embodiment corresponds to a transmitting/receiving module of the present invention. The flash ROM 23 corresponds to a storage module. The printing mechanism 26 corresponds to a printing module. The CPU 22 corresponds to a control module. Further, the setting module 35a and the wireless interface driver 36 correspond to communication processing data. The recording paper S corresponds to a printing medium. Incidentally, this embodiment describes operations of the firmware updating system 10 for the purpose of explaining an example of the information updating method of the present invention.

According to the above-described firmware updating system 10 of this embodiment, in response to receipt of a program update instruction as an instruction to update the information processing program, the printer 20 as an information processor stores the setting information file 32a created on the basis of the setting information 38a together with the wireless interface driver 36 and the setting module 35a used for communication processing and stored in the information processing program 33 to the basic update use information 32. Then, the printer receives a new information processing program from the user PC 50 by use of the program update module 34 and determines whether or not the received new information processing program is normal. If it is determined that the received new information processing program is not normal, the printer uses the basic update module 31 to allow communications with the router 40 (user PC 50) on the basis of information stored as the basic update use information 32. In this way, at the time of updating the information processing program 33, any error might occur in the wireless interface driver 36, the setting module 35a, or the program update module 34 stored in the information processing program 33 to be updated. However, the wireless interface driver 36 is saved in the basic update use information 32 stored in an area different from a memory area for the information processing program 33, so the saved wireless interface driver 36 can be used later with the basic update module 31. Further, the basic update module 31 is protected from overwriting, so no trouble occurs upon update processing of the information processing program 33. Hence, even if an error occurs in information used for communication processing at the time of updating the information processing program 33 through communications with the user PC 50, the printer 20 can reliably communicate with the user PC 50. Further, since a new information processing program can be received from the user PC 50 through communications, recovery from the trouble is more facilitated. In addition, the wireless interface driver 36 is saved in the basic update use information 32, so a memory area used for updating the information processing program 33 can be reduced as compared with the case of saving the information processing program 33 in another area of the flash ROM 23 in the event of an error upon updating. Moreover, since the information processing program 33 including the program update module 34 or the like is updated at a time, the information processing program 33 can be updated within a short processing time as compared with the case of updating and rebooting each module.

Further, since the setting information file 32a necessary for the updated wireless interface driver 36 and the setting module 32b for passing the setting information file 32a to the wireless interface driver 32c are stored in the basic update use information 32, even if the wireless interface driver 36 is updated and a new set value is used, the printer can reliably communicate with the user PC 50 by use of the basic update module 31. Further, the setting module 35a of the wireless communication module 35 used for communications with the user PC 50 is stored in the basic update use information 32, so a memory area necessary for updating the information processing program 33 can be more reduced than a printer that directly stores the wireless communication module 35 including a database interpretation module in the basic update use information 32. Moreover, if communications with the user PC 50 are reestablished and a new information processing program is received after the update processing of the information processing program 33 was suspended, a current information processing program is updated on the basis of the received new information processing program, so recovery from the involved error is more facilitated than a printer that acquires the information processing program 33 not through communications. Since specifications of the wireless communication are frequently updated, it is very effective to apply the present invention to the printer 20 that uses the wireless LAN 43. Further, image information is transmitted through communications in many cases to print an image on the recording paper S, and a printing module is frequently updated, so it is very effective to apply the present invention thereto.

The present invention is not limited to the above embodiment. Needless to say, the present invention can be embodied in various modes without departing from the technical scope of the present invention.

For example, in the above embodiment, the setting information file 32a, the setting module 32b, and the wireless interface driver 32c are stored and saved in the basic update use information 32 prior to update processing of the information processing program 33, but only the wireless interface driver 32c may be stored in the basic update use information 32. In this case as well, if the basic update module 31 can use the wireless interface driver 32c, even when an error occurs in the wireless interface driver used for communication processing, the printer can communication with the user PC 50 with reliability. Although the program update module 34 is incorporated in the information processing program 33 in the above description, the program update module 34 may be stored separately from the information processing program 33. In this case as well, even if the program update module 34 is affected by updates of the information processing program 33, the printer can reliably communicate with the user PC 50 by use of the basic update module 31 protected from overwriting.

In the above embodiment, the wireless interface driver 36 is incorporated into the information processing program 33 and is stored in the basic update use information 32 but may be stored and updated separately from the information processing program 33, and the setting information file 32a and the setting module 35a may be stored in the basic update use information 32. In this case as well, the wireless interface driver 36 can normally operate, and even if an error occurs in the communication management information 38 or the wireless communication module 35, the wireless interface driver 36 can be used by use of the basic update module 31 due to the basic update module 31. Thus, even if an error occurs in the wireless interface driver 36 at the time of updating the information processing program 33, the printer can reliably communicate with the user PC 50. Further, the setting module 35a of the wireless communication module 35 is stored in the basic update use information 32, so a memory area used for updating the information processing program 33 can be more reduced than a printer that directly stores a communication module in the basic update use information.

In the above embodiment, the basic update use information 32 is stored in a general memory are of the flash ROM 23 but may be stored in a mask area. If so, the basic update use information 32 can be more securely protected. Moreover, in the above description, the basic update module 31 or the IPL 30 is stored in the mask area of the flash ROM 23 but may be stored outside the mask area in a rewrite-disabled form.

In the above embodiment, the printer 20 and the router 40 are connected together via the wireless LAN 43 but may be connected through the wired LAN 42. In this case as well, the printer can reliably communicate with the user PC 50 by use of the communication interface driver saved in the basic update use information 32 due to the basic update module 31.

In the above embodiment, the information processing program 33 stored in the printer 20 is updated through communications with the user PC 50 via the router 40 but may be updated through direct communications with the printer 20 through the wireless LAN board provided to the user PC 50 or may be updated through communications with the printer 20 via the router 40 from the information server 60, that is, not through the user PC 50. Further, in the above embodiment, an update instruction is sent from the user PC 50 to update the information processing program 33 but may be sent with an operation panel (not shown) of the printer 20 to update the information processing program 33.

In the above embodiment, the printer 20 is described as the information processor of the present invention but may be applied to a multifunction printer equipped with a scanner, a FAX, or the like. Further, the printing mechanism 26 is described as an ink-jet mechanism but may be a thermal transfer printer or a dot impact printer, or a monochrome type thermal transfer or dot impact printer. Further, there is not particular limitation on applications if firmware is updated through communications. The present invention may be applied to a PC, a scanner, a picture viewer for reproducing an image, a television, a digital video recorder, a camera phone, or the like. In particular, a portable device or a peripheral device connected to a PC or server is limited of hardware resources, so it is very effective to apply the present invention thereto. Incidentally, the information processing program 33 may not store the printing module 37 or may store other firmware. Further, in the above description, the present invention is embodied in the form of the printer 20 but may be embodied as an information updating method or a program used for the method.

The present application claims priority from Japanese Patent Application No. 2006-297884 filed on Nov. 1, 2006, the entire contents of which are incorporated herein by reference.

What is claimed is:

1. An information updating method executable by a processor, which stores update information about a new update and updates information by use of an information processor through communications with an external device capable of outputting the update information, the information processor having a storage module that stores an information processing program which stores communication processing data used for the communications and executes communication processing, a program update sub-module which updates the information processing program by using data obtained through communication by the information processing program, a basic update sub-module which is protected from overwriting and updates information stored in the information processor, and basic update use information which is stored in an area different from an area for the information processing program and stores information used by the basic update sub-module, said information updating method comprising the steps of:
   (a) in response to reception of a program update instruction as an instruction to update the information processing program, storing, by a control module of the information processor, the communication processing data in the basic update use information after changing to a format which can be used by the basic update sub-module;
   (b) receiving a new information processing program from the external device by use of the program update sub-module and determining whether or not the updated new information processing program is normal after updating the information processing program to a new information processing program; and
   (c) when a determination result shows that the new information processing program is not normal, establishing communication with the external device in accordance with the communication processing data stored in the basic update use information by use of the basic update sub-module;
   wherein the basic update sub-module is accessible from the control module;
   wherein the storage module stores communication management information which stores setting information used for a communication driver as the communication processing data, and the information processing program which stores the program update sub-module and a communication sub-module, the communication sub-module including a setting sub-module as the communication processing data for passing the setting information to the communication driver and being capable of executing communication processing of the transmitting/receiving module;
   the transmitting/receiving module transmits/receives information to and from the external device by wireless communication;
   the communication driver is used for wireless communication and the setting information includes at least service set identification (SSID), and
   wherein when a determination result shows that the new information processing program is not normal, establishing communication with the external device in accordance with the setting information including the SSID stored in the basic update use information by causing the basic update sub-module to make the setting sub-module pass the setting information to the communication driver so as to drive communication driver.

2. A hardware information processor that stores update information about a new update and updates information through communications with an external device capable of outputting the update information, comprising:
   a transmitting/receiving module that transmits/receives information to and from the external device by wireless communication;
   a storage module that stores an information processing program which stores communication processing data used for communication processing of the transmitting/receiving module and executes the communication processing of the transmitting/receiving module, a program update sub-module which updates the information processing program by using data obtained through communication by the information processing program, a basic update sub-module which is protected from overwriting and updates information stored in the information processor, and basic update use information which is stored in an area different from an area for the information processing program and stores information used by the basic update sub-module; and
   a control module that, in response to reception of a program update instruction as an instruction to update the information processing program by the transmitting/receiving module, stores the communication processing data in the basic update use information after changing to a format which can be used by the basic update sub-module, causes the transmitting/receiving module to receive a new information processing program from the external device by use of the program update sub-module, determines whether or not the updated new information processing program is normal after updating the information processing program to a new information processing program, and, when a determination result shows that the new information processing program is not normal, makes the transmitting/receiving module communicable with the external device in accordance with the communication processing data stored in the basic update use information by use of the basic update sub-module;
   wherein the basic update sub-module is accessible from the control module, and
   wherein the storage module stores communication management information which stores setting information used for a communication driver as the communication processing data, and the information processing program which stores the program update sub-module and a communication sub-module, the communication sub-module including a setting sub-module as the communication processing data for passing the setting information to the communication driver and being capable of executing communication processing of the transmitting/receiving module, the communication driver is used for wireless communication and the setting information includes at least service set identification (SSID), and the control module, in response to reception of a program update instruction as an instruction to update the information processing program by the transmitting/receiving module, stores the setting sub-module and the communication driver as the communication processing data stored in the information processing program and the setting information including the SSID stored in the communication management information in the basic update use information, and when a determination result shows that the new information processing program is not normal, the control module makes the transmitting/receiving module communicable with the external device in accordance with the setting information including the SSID stored in the basic update use information by causing the basic update sub-module to make the setting sub-module pass the setting information to the communication driver so as to drive communication driver.

3. The hardware information processor according to claim 2, wherein the storage module stores a communication driver used for communication processing of the transmitting/receiving module, communication management information which stores setting information used by the communication driver, and the information processing program which stores the program update sub-module and a communication sub-module, the communication sub-module including a setting sub-module as the communication processing data for passing the setting information to the communication driver and being capable of executing communication processing of the transmitting/receiving module, and the control module, in response to reception of a program update instruction as an instruction to update the information processing program by the transmitting/receiving module, stores the setting information and the setting sub-module stored in the storage module in the basic update use information, and makes the transmitting/receiving module communicable with the external device in accordance with the setting information and the setting sub-module stored in the basic update use information and the communication driver stored in the storage module by use of the basic update sub-module when a determination result shows that the new information processing program is not normal.

4. The hardware information processor according to claim 2, wherein the control module makes the transmitting/receiving module communicable with the external device in accordance with information stored in the basic update use information by use of the basic update sub-module, and, in response to reception of a new information processing program from the external device during communications with the external device are established, updates a current information processing program to the received new information processing program.

5. The hardware information processor according to claim 2, wherein the transmitting/receiving module transmits/receives information to/from the external device by wireless communication.

6. The hardware information processor according to claim 2, further comprising:

a print execution module that executes printing an image on a printing medium, wherein the storage module stores the information processing program that stores a printing sub-module used by the print execution module.

* * * * *